United States Patent

Nelson et al.

[11] Patent Number: 5,765,208
[45] Date of Patent: Jun. 9, 1998

[54] METHOD OF SPECULATIVELY EXECUTING STORE INSTRUCTIONS PRIOR TO PERFORMING SNOOP OPERATIONS

[75] Inventors: Jacqueline S. Nelson, Austin; Nicholas G. Samra, Plano, both of Tex.

[73] Assignee: Motorola, Inc., Schaumburg, Ill.

[21] Appl. No.: 537,049

[22] Filed: Sep. 29, 1995

[51] Int. Cl.⁶ ........................................ G06F 9/38
[52] U.S. Cl. ............... 711/204; 711/146; 711/213; 711/145; 711/144; 395/584; 395/586
[58] Field of Search ............... 395/471, 472, 395/479, 473, 457, 584, 586; 364/DIG. 1; 711/204, 213

[56] References Cited

U.S. PATENT DOCUMENTS

| 5,237,694 | 8/1993 | Horne | 395/726 |
|---|---|---|---|
| 5,394,555 | 2/1995 | Hunter et al. | 711/148 |
| 5,404,489 | 4/1995 | Woods et al. | 711/152 |
| 5,437,031 | 7/1995 | Kitami | 395/680 |
| 5,522,057 | 5/1996 | Lichy | 711/144 |
| 5,551,005 | 8/1996 | Sarangdhar et al. | 711/145 |
| 5,553,255 | 9/1996 | Jain et al. | 395/582 |
| 5,598,550 | 1/1997 | Shen et al. | 711/146 |
| 5,710,906 | 1/1998 | Ghosh et al. | 711/146 |
| 5,713,004 | 1/1998 | Kimmel et al. | 711/145 |

*Primary Examiner*—Tod R. Swann
*Assistant Examiner*—J. Peikari

[57] ABSTRACT

A data processor (10) has a load/store unit (28) that executes store-to-shared-data instructions before it exclusively owns the data designated by the instruction. Later, a bus interface unit (12) performs a snoop transaction to obtain exclusive ownership of the data. If data processor successfully obtains such ownership, then the data processor correctly and quickly executed the instruction with no further action required. If the data processor can not obtain ownership of the data, then data processor re-executes the instruction in the same time as if it had not acted speculatively.

5 Claims, 2 Drawing Sheets

METHOD OF SPECULATIVELY EXECUTING STORE INSTRUCTIONS PRIOR TO PERFORMING SNOOP OPERATIONS

FIELD OF THE INVENTION

The present invention generally relates to digital computing systems, and more specifically to the execution of store instructions.

BACKGROUND OF THE INVENTION

Modern data processors are designed to support multiprocessor data processing applications. In a multi-processor data processing system, each one of two or more data processors can manipulate data stored in a common memory space independent of the other data processor. Therefore, such a data processing system must implement a memory coherency protocol to insure data consistency throughout the various data processors.

A particular memory coherency protocol known by the acronym "MESI" and pronounced "messy" implements a four state memory coherency protocol to insure data consistency throughout the various subsystems of a multiprocessor data processing system. This memory coherency protocol assigns one state to every quantity of data while the data is stored outside of main memory space: modified ("M"), exclusive ("E"), shared ("S"), or invalid ("I"). Whenever one data processor performs an operation on a quantity of data stored in one of its caches, the data processor broadcasts its intention to the other data processor. The other data processor monitors or "snoops" the transaction and, if necessary, takes action to insure coherent data. For instance, if the second data processor contains a copy of the snooped data in one of its caches and the data has been modified relative to the copy of the data stored in the main memory space, then the second data processor interrupts the first and pushes the modified data back to the main memory space. The first data processor can then obtain the most current copy of data from the main memory space. If the second data processor contains a copy of the snooped data in one of its caches and the data is only classified as shared or exclusive (not yet modified), then the second data processor modifies the memory state of its copy of the data to invalid. Implicit in this coherency protocol is the limitation that a data processor cannot read data unless it has a copy of the data that is classified as modified, exclusive, or shared. Also, a data processor cannot write to or modify data unless it has a copy of the data that is classified as modified, or exclusive. If a data processor modifies exclusive data, then it changes the memory state of the data to modified.

One performance impact of such a memory coherency protocol is the store-to-shared-data operation. In this operation, a data processor desires to store data to a quantity of cache data which it classifies only as "shared". Normally, the data processor must obtain exclusive ownership of this data before it can complete this instruction. Such a procedure requires obtaining control of the common communications bus associated with the data processor and issuing a "kill" snoop transaction to every other device on the communications bus. Only then can the data processor change the memory state of the data to exclusive and modify the data. Currently, data processors operate at significantly greater speeds than do their associated communications buses. Consequently, store-to-shared-data operations introduce significant delays into instruction processing.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
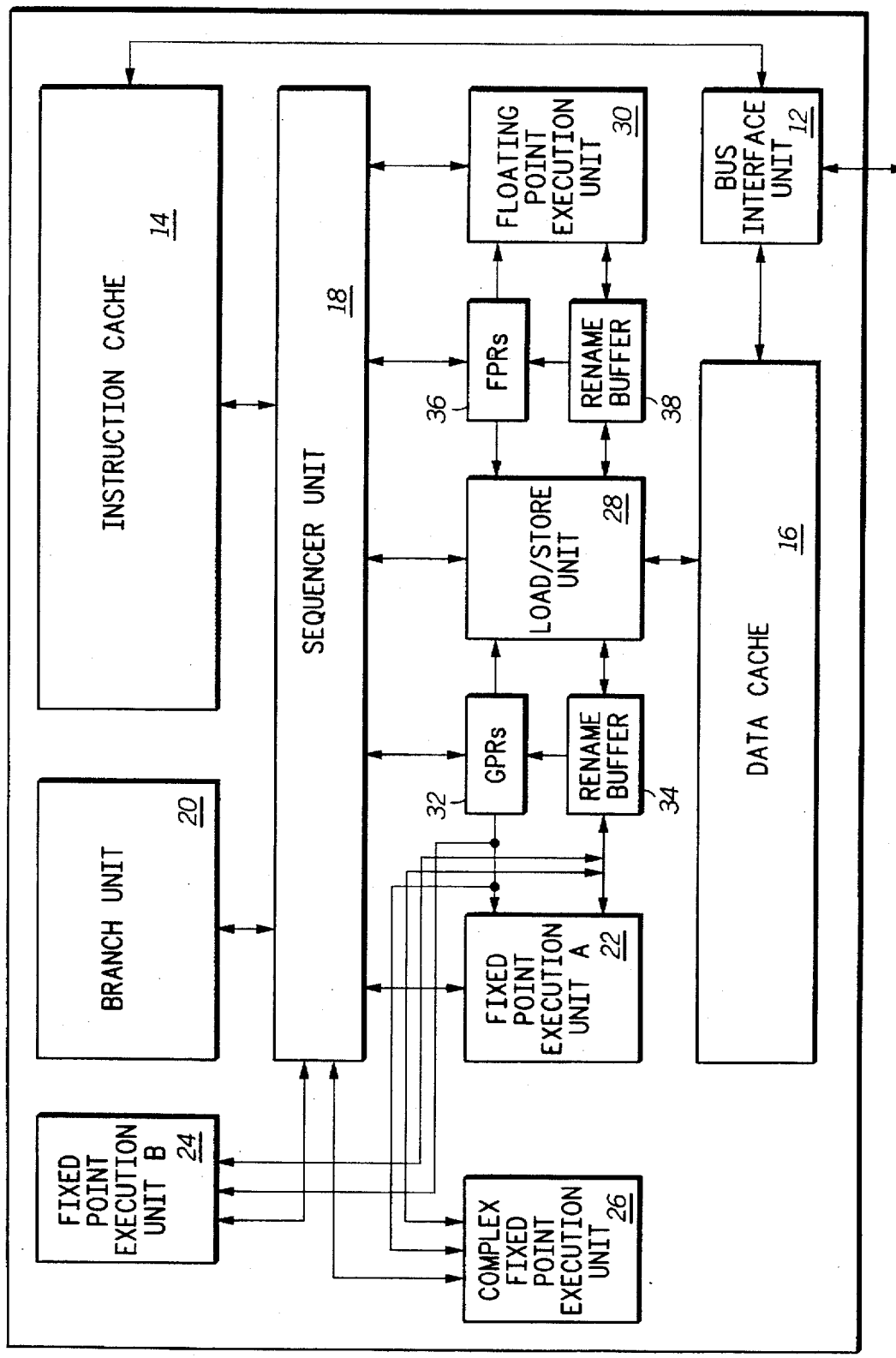
FIG. 1 depicts a block diagram of a data processor constructed in accordance with the present invention.

FIG. 1 depicts a block diagram of a data processor 10 constructed in accordance with the present invention. Data processor 10 executes store-to-shared-data instructions before it exclusively owns the data, or "speculatively." Later, data processor 10 performs a snoop transaction to obtain exclusive ownership of the data If data processor 10 successfully obtains such ownership, then data processor 10 correctly and quickly executed the instruction with no further action required. If data processor 10 can not obtain ownership of the data, then data processor 10 re-executes the instruction in the same time as if it had not acted speculatively.

Continuing with FIG. 1 a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 30 and load/store execution unit 28 read and write their results to a floating point architectural register file 36, (labeled FPRs and hereafter FPR file) and to a second rename buffer 38.

The operation of data processor 10 without the disclosed speculative store-to-shared data instruction is known in the art. In general, branch unit 20 determines what sequence of programmed instructions is appropriate given the contents of certain data registers and the instructions themselves. Instruction cache 14 provides this sequence of programmed instructions to sequencer unit 18. If instruction cache 14 does not contain the required instructions, then it will fetch them from a main memory system external to data processor 10 (not shown).

Sequencer unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 coordinates this updating. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12. The operation of load/store unit 28 is further described below in connection with FIG. 2.

In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipelining." In the depicted embodiment, each instruction is broken into five discrete steps: fetch, decode, dispatch, execute, and completion. In the fetch stage, the instruction cache 14 retrieves one or more instructions beginning at a memory address identified by sequencer unit 18 or by branch unit 20 in the prior clock cycle. This memory address is called the fetch address. In the decode stage, instructions are decoded by the sequencer unit 18 into a number of control signals for use by subsequent stages. In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched. In the execute stage, each particular execution unit executes its programmed instruction. Results, if any, are returned either to rename buffer 34 or rename buffer 38, respectively, for integer and floating point results. In the completion stage, sequencer unit 18 updates the architectural register files with the result of a particular instruction stored in a rename buffer after every instruction preceding the particular instruction has so updated the architectural register file. The completion stage also updates all other architectural states in the machine after every instruction preceding the particular instruction has so updated the architectural state. Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 2:
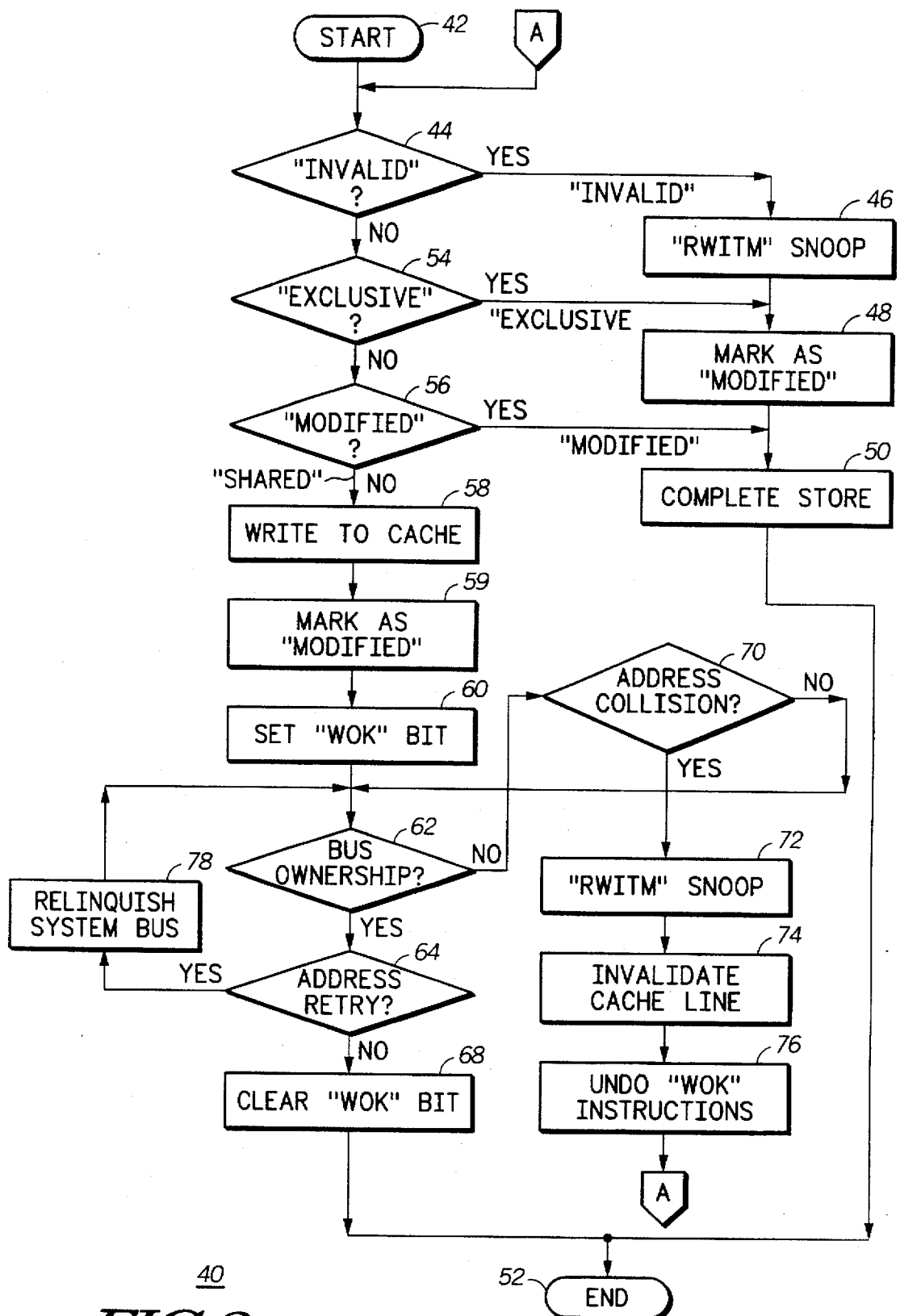
FIG. 2 depicts a flow diagram illustrating the operation of the data processor depicted in FIG. 1.

FIG. 2 depicts a flow diagram 40 illustrating the operation of data processor 10 depicted in FIG. 1. As described above, sequencer unit 18 dispatches store instructions to load/store unit 28. (Load instructions are not relevant to the understanding of the present invention.) Load/store unit executes the instruction by calculating the destination address of the instruction and accessing data cache 16, a step 42. Because of the delay often involved with store instructions, load/store unit 28 maintains a first-in-first-out ("FIFO") queue (not shown) to buffer instructions which are dispatched to it but yet are not finished due to bus latencies and in-order execution requirements. This FIFO queue maintains certain status information about each buffered instruction as described below. Load/store unit 28 then reads what the state of the destination memory address is within data processor 10.

If the referenced data is not present in data cache 16 or is present but has been invalidated by some other process, then the data is considered and is marked "invalid," a step 44. If the referenced data is invalid, then data processor 10 must first acquire the data from the main memory space. In this case, load/store unit 28 forwards a read-with-intent-to-modify (or RWITM) snoop operation to the system bus via BIU 12, a step 46. In a MESI protocol, data processors execute RWITM operations to acquire a copy of data that they expect to modify immediately. Later, when the data returns to data processor 10, BIU 12 writes the data to data cache 16 as modified data, a step 48. Finally, load/store unit 28 updates the data in data cache 16 as specified in the original store instruction, a step 50. Load/store unit 28 also marks the instruction as finished in its FIFO queue. If this instruction is the oldest instruction in the queue and a waiting-on-kill ("WOK") bit is clear, then load/store unit 28 can advance the head of the FIFO queue, completing all action required of the store instruction. (The WOK bit is set only in connection with a store-to-shared-data instruction described below.) Otherwise, load/store unit 28 will wait until other store instructions complete, making the store instruction the oldest store instruction in the FIFO queue. The store instruction is complete, a step 52.

If the referenced data is present in data cache 16 and data processor 10 has permission to modify the data, then the data is considered and is marked "exclusive," a step 54. In this case, data processor 10 already contains a copy of the data from the main memory space. Load/store unit 28 changes the state of the data in data cache 16 to modified, step 48. Finally, load/store unit 28 updates the data in data cache 16 as specified in the original store instruction, step 50. Load/store unit 28 may also mark the instruction as finished in its FIFO queue as described above. The store instruction is complete, step 52.

If the referenced data is present in data cache 16 and data processor 10 has already changed its copy of the data relative to the copy stored in the main memory space, then the data is considered and is marked "modified," a step 56. In this case, the memory state of the data already reflects the final state, modified. Then, load/store unit 28 simply updates the data in data cache 16 as specified in the original store instruction, step 50. Load/store unit 28 may also mark the instruction as finished in its FIFO queue as described above. The store instruction is complete, step 52.

As described by the MESI memory coherency protocol, if the accessed data is not invalid, exclusive, or modified, then the data is considered and is marked "shared." Data processor 10 normally can only read from, but not write to, shared data. This limitation ordinarily reduces the throughput of store instructions and subsequent load instructions to the same data. According to the present invention, load/store unit 28 speculatively writes the specified data to data cache 16, a step 58. Therefore, other instructions can immediately access the new data. Load/store unit 28 also changes the memory state of the data to modified, a step 59, and sets the WOK bit associated with the instruction in the FIFO queue, a step 60. This bit, when set, prevents the instruction and subsequent instructions from completing or updating architectural registers while the possibility of error exists. Then, BIU 12 begins a snoop kill operation by acquiring ownership of the system bus, a step 62. This operation may or may not be temporarily delayed by another data processor if the other data processor asserts a bus signal ADDRESS RETRY, a step 64. If BIU 12 successfully broadcasts the snoop kill operation to the data processing system, then data cache 16 simply clears the store instruction's WOK bit, a step 68. The store instruction can then be finished as described above. The store instruction is complete, step 52.

Unfortunately, not all store-to-shared-data instructions will complete without interference from other data processors in a multi-processor data processing system. The disclosed invention anticipates these situations and provides a mechanism for resolution that is as fast as non-speculative execution.

For instance, while BIU 12 waits to acquire ownership of the system bus, another data processor may execute a kill operation to the same accessed data. In this case, the other data processor will broadcast the same destination address to BIU 12 as calculated by load/store unit 28. This scenario is referred to as an "address collision" because the incoming snooped address matches the outgoing buffered address in BIU 12, a step 70. In response to such a collision, BIU 12 will change its pending kill snoop operation to a RWITM snoop operation, a step 72. Data cache 16 will invalidate its copy of the data, a step 74. BIU 12 will also "undo" any instructions in the FIFO queue of load/store unit 28 that match the collided address, a step 76. In the depicted embodiment, this step of "undoing" forces a particular pointer of the FIFO queue to retreat to the oldest instruction whose destination address matches the "collided" address. Load/store unit 28 automatically presents the instruction indexed by this particular pointer to data cache 16 in the next clock cycle. As depicted in FIG. 2, flow diagram 40 returns to step 44 to re-execute the incorrectly executed load/store instructions, "A." If BIU 12 does not detect an address collision in step 70, then it returns to step 62.

Another problem can arise even if BIU 12 acquires ownership of the system bus. Here, another data processor may force data processor 10 to retry the snoop operation at a later time, step 64. Such a event occurs, for instance, if the other data processor is unable to review its data contents at the time of the kill snoop operation because of a resource conflict. In this case, BIU 12 relinquishes ownership of the system bus, a step 78, and returns to step 62.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functions may be relocated to other areas of data processor 10. It is to be understood therefore, that the invention encompasses all such modifications that do not depart from the spirit and scope of the invention as defined in the appended claims.

What is claimed is:

1. A method of speculatively executing store instructions in a data processor prior to broadcasting a snoop operation on a system bus, the data processor accessing data from a main memory space, the main memory space comprising a plurality of data quantities, the data processor caching a subset of plurality of data quantities in a memory cache, each data quantity of the subset specified as either shared or exclusive according to a memory coherency protocol, the method comprising the steps of:

accessing one data quantity of the subset in a first location of the memory cache, the one data quantity specified as shared;

first storing a new data value in the first location, thereby changing a state of the first location from shared to exclusive; and broadcasting a snoop operation on a system bus coupled to the data processor after changing the state.

2. The method of claim 1 further comprising the steps of:

prior to the step of broadcasting, receiving a snoop kill operation
   from the system bus; and invalidating the one data quantity of the subset in the location of the memory cache.

3. The method of claim 2 further comprising the step of second storing the new data value in the first location after the step of invalidating.

4. A method of speculatively executing store instructions in a data processor prior to broadcasting a snoop operation on a system bus, the data processor accessing data from a main memory space, the main memory space comprising a plurality of data quantities, the data processor caching a subset of plurality of data quantities, each data quantity of the subset specified as either shared or exclusive according to a memory coherency protocol, the method comprising the steps of:

at a first time;
      receiving a store instruction in the data processor, the store instruction comprising an operand;
      calculating a destination address, a quantity of data indexed by the destination address specified as shared;
      accessing one data quantity of the subset in a location of the memory cache;
      first storing the operand in the first location; thereby changing a state of the first location from shared to exclusive and at a second time subsequent to the first time; broadcasting a snoop operation on a system bus coupled to the data processor.

5. The method of claim 4 wherein the data processor comprises a store buffer, and wherein the step of first storing further comprises the steps of:

storing the store instruction in the store buffer; and
   setting a first bit in the store buffer associated with the store instruction to a first value if the quantity of data indexed by the destination address is specified as shared and setting the first bit to a second value if the quantity of data indexed by the destination address is specified as exclusive.

* * * * *